(12) United States Patent
Salter et al.

(10) Patent No.: US 9,789,810 B2
(45) Date of Patent: Oct. 17, 2017

(54) PHOTOLUMINESCENT VEHICLE PANEL

(71) Applicant: Ford Global Technologies, LLC, Dearborn, MI (US)

(72) Inventors: Stuart C. Salter, White Lake, MI (US); Michael James Whitens, Milford, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 432 days.

(21) Appl. No.: 14/603,656

(22) Filed: Jan. 23, 2015

(65) Prior Publication Data

US 2015/0138819 A1 May 21, 2015

Related U.S. Application Data

(63) Continuation-in-part of application No. 14/086,442, filed on Nov. 21, 2013.

(51) Int. Cl.
| | | |
|---|---|---|
| *B60Q 1/00* | (2006.01) | |
| *B60Q 1/26* | (2006.01) | |
| *B60Q 11/00* | (2006.01) | |
| *F21S 8/10* | (2006.01) | |
| *B60Q 1/38* | (2006.01) | |
| *B60Q 1/50* | (2006.01) | |

(52) U.S. Cl.
CPC ......... *B60Q 1/2661* (2013.01); *B60Q 1/0035* (2013.01); *F21S 48/214* (2013.01); *F21S 48/2212* (2013.01); *B60Q 1/38* (2013.01); *B60Q 1/50* (2013.01); *B60Q 2400/20* (2013.01)

(58) Field of Classification Search
CPC ... B60C 1/0035; B60C 1/2619; B60C 1/2661; B60C 1/2696; B60C 1/38; B60C 1/50; B60C 2400/20; F21S 48/214; F21S 48/2212
USPC ................................ 362/487, 496, 509–510
See application file for complete search history.

(56) References Cited

U.S. PATENT DOCUMENTS

| | | | |
|---|---|---|---|
| 4,996,442 | A | 2/1991 | Wayne |
| 5,053,930 | A | 10/1991 | Benavides |
| 5,157,377 | A | 10/1992 | Wayne |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

A vehicle illumination apparatus is disclosed. The apparatus comprises at least one aperture disposed in a panel of the vehicle. A light source is disposed proximate the aperture and configured to emit a first emission having a first wavelength. A first photoluminescent portion is disposed proximate the panel substantially within the aperture and configured to emit a second emission having a second wavelength in response to receiving the first emission.

16 Claims, 7 Drawing Sheets

(56) References Cited

U.S. PATENT DOCUMENTS

| | | |
|---|---|---|
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,840,660 B2 | 1/2005 | Hymer |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,332,877 B2 | 2/2008 | Crodian et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,589,622 B2 | 9/2009 | Farley |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0049386 A1 | 2/2014 | Staffanou |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2013062572 A1 | 5/2013 |
| WO | 2014068440 A1 | 5/2014 |

PHOTOLUMINESCENT VEHICLE PANEL

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle illumination apparatus is disclosed. The apparatus comprises at least one aperture disposed in a panel of the vehicle. A light source is disposed proximate the aperture and configured to emit a first emission having a first wavelength. A first photoluminescent portion is disposed proximate the panel substantially within the aperture and configured to emit a second emission having a second wavelength in response to receiving the first emission.

According to another aspect of the present invention, a vehicle illumination apparatus is disclosed. The apparatus comprises at least one aperture disposed in a panel of the vehicle. A light source is disposed proximate the aperture and configured to emit a first emission having a first wavelength. A first photoluminescent portion is disposed proximate the panel and substantially within the aperture. The photoluminescent portion is configured to emit a second emission having a second wavelength in response to receiving the first emission.

According to yet another aspect of the present invention, a vehicle illumination apparatus is disclosed. The apparatus comprises a plurality of apertures disposed in a panel of the vehicle. A light source comprising a plurality of emitters is disposed proximate the apertures and configured to emit a first excitation emission. A photoluminescent portion is disposed substantially within the aperture and configured to emit a first output emission in response to receiving the first excitation emission. A controller is in communication with the light source and operable to selectively activate each of the emitters.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of a vent or hood scoop disposed in a hood or panel of the vehicle. In some embodiments, a light source comprising a plurality of emitters may be utilized to selectively illuminate a plurality of apertures that form the vent. The light source may be configured to emit light at a first wavelength from the emitters or an excitation emission to excite at least one photoluminescent portion disposed proximate at least one of the apertures. The photoluminescent portion may be configured to convert the first wavelength into a second wavelength or an output emission. The first wavelength may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
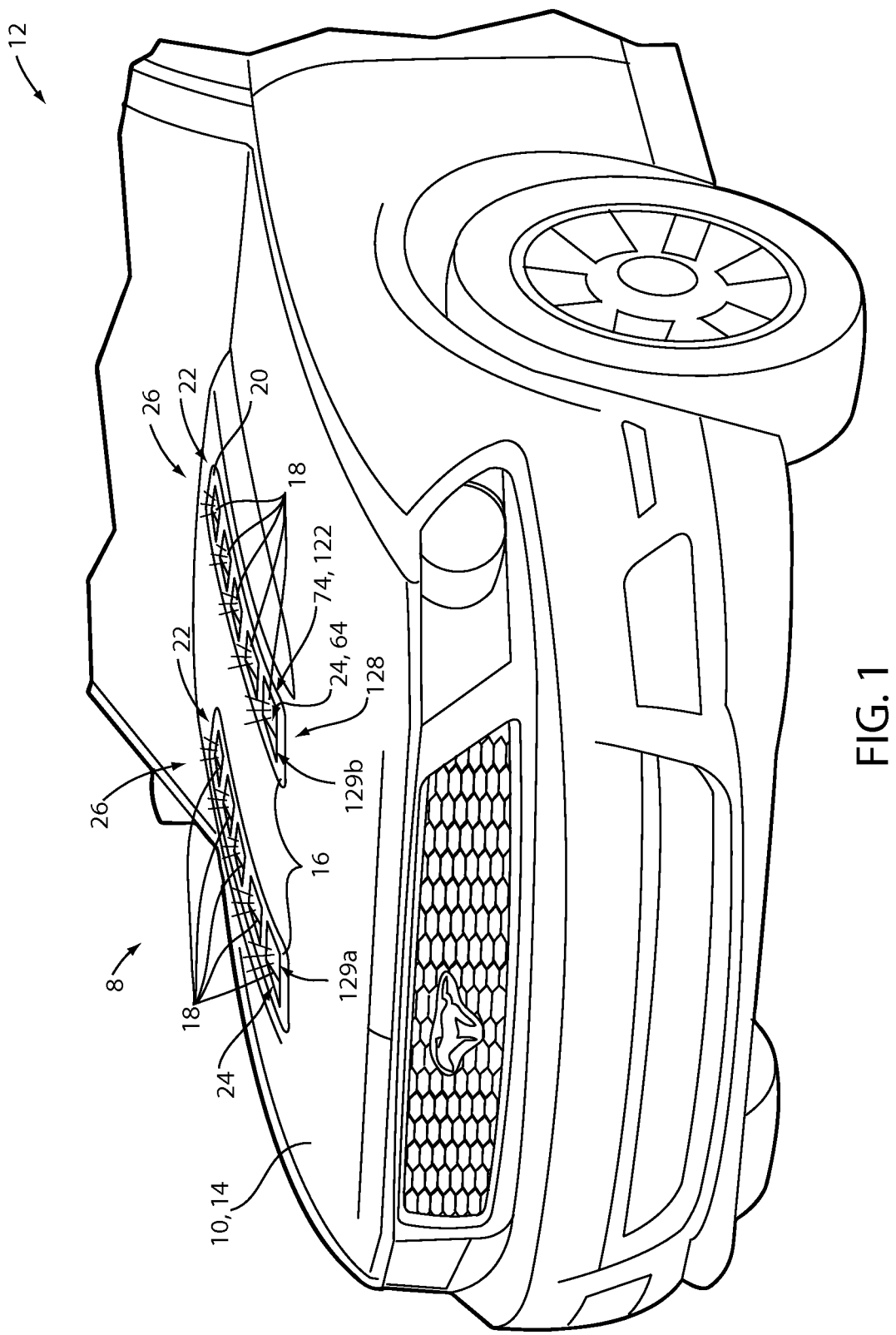
FIG. 1 is a perspective view of an exterior of a vehicle demonstrating a lighting system.

Referring to FIG. 1, a lighting system 8 is shown in a projected view of a panel 10 of a vehicle 12. The panel 10 may correspond to a hood 14 of the vehicle 12 configured to significantly enclose an engine compartment. A portion of the hood 14 may correspond to at least one vent 16. The at least one vent 16 may comprise a plurality of apertures 18 formed in the panel 10 or an insert 20 disposed in the panel 10. Proximate at least one of the apertures 18, a light source 22 is disposed and configured to emit at least one excitation emission. The excitation emission may be configured to excite at least one photoluminescent portion 24 disposed proximate at least one of the apertures 18 such that the photoluminescent portion 24 emits an output emission 26. In this configuration, the lighting system 8 may be operable to illuminate at least one of the apertures 18 to create an ambient lighting effect for the vehicle 12.

The at least one photoluminescent portion 24 may be configured to convert an excitation emission emitted from the light source 22 to the output emission 26. The excitation emission may comprise the first wavelength of light. The output emission 26 and each of the output emissions discussed herein may comprise at least a second wavelength of the light. The second wavelength of light may comprise at least one wavelength having a longer wavelength than the first wavelength. As discussed herein, the photoluminescent portion 24 and other photoluminescent portions may be configured to have photochemical properties configured to convert the first wavelength of light from the light source 22 to the second wavelength. The second wavelength may comprise additional wavelengths, including various combinations of wavelengths to emit light from the lighting system 8.

The first wavelength of the excitation emission may correspond to a violet or deep blue color of light. The first wavelength may have a peak wavelength of approximately less than 500 nm. The second wavelength of the one or more output emissions may correspond to one or more wavelengths of light comprising at least one wavelength greater in length than the first wavelength. In some implementations, the second wavelength may correspond to a plurality of wavelengths that may cause the output emissions to appear as significantly white light. In this configuration, the light emitted from the light source 22 at the first wavelength is configured to excite the photoluminescent portion 24. In response to the excitation caused by receiving the light at the first wavelength, the photoluminescent portion 24 may be configured to convert the first wavelength to emit the output emission 26 to illuminate at least a portion of the vent 16 proximate at least one of the apertures 18.

The light source 22 may comprise a plurality of emitters in communication with a controller. The controller may be configured to selectively illuminate each of the plurality of emitters in response to one or more vehicle conditions or states. For example, an emitter may be disposed proximate each of the apertures 18 proximate a surface formed by the panel 10. Each of the emitters may be configured to illuminate at least a portion of a surface of the vent 16 and/or a screen disposed in each of the apertures 18. In some embodiments, the controller is configured to selectively activate each of the emitters such that the photoluminescent portions 24 are excited and emit the output emission 26 selectively from each of the apertures. In this configuration, the lighting system 8 may be configured to selectively illuminate each of the apertures corresponding to a tachometer function, a turn indicator, a temperature gauge, a vehicle status, and/or a variety of vehicle conditions or states. The disclosure may provide for lighting systems configured to provide lighting to improve an appearance and add valuable features to the vehicle 12.

Figure 2A:
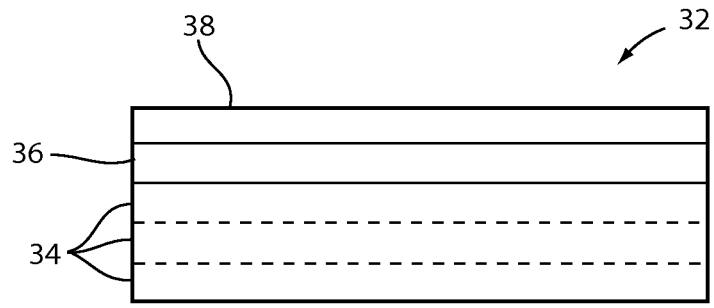
FIG. 2A illustrates a side view of a photoluminescent structure rendered as a coating.
Figure 2B:
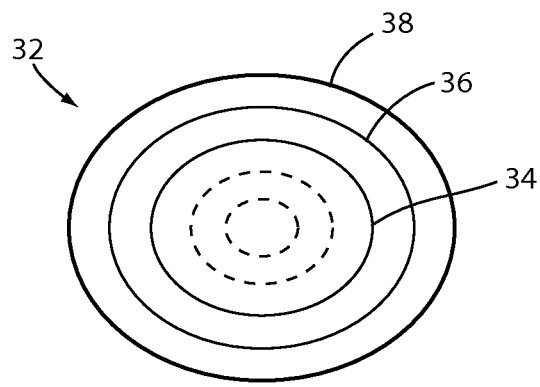
FIG. 2B illustrates a side view of a photoluminescent structure rendered as a discrete particle.
Figure 2C:
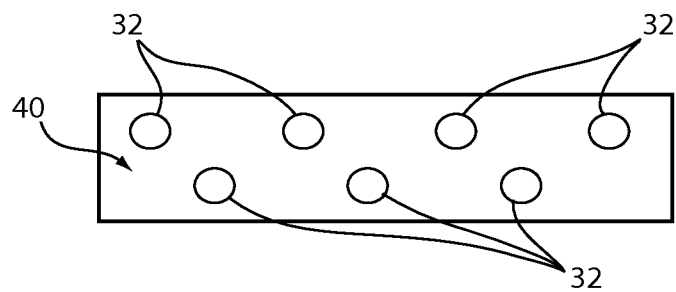
FIG. 2C illustrates a side view of a plurality of photoluminescent structures rendered as discrete particles and incorporated into a separate structure.

Referring to FIGS. 2A-2C, a photoluminescent structure 32 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. As described herein, a vehicle fixture may correspond to surface or portion of the vehicle 12, for example the surface of one or more apertures 18 formed in the panel 10. The photoluminescent structure 32 may correspond to the photoluminescent portions 24. At the most basic level, the photoluminescent structure 32 includes an energy conversion layer 34 that may be provided as a single layer or a multilayer structure, as shown through broken lines in FIGS. 2A and 2B.

The energy conversion layer 34 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiation is referred to as the Stokes Shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 32 comprising an energy conversion layer (e.g. conversion layer 34). The energy conversion layer 34 may be prepared by dispersing the photoluminescent material in a polymer matrix 40 to form a homogenous mixture using a variety of methods. Such methods may include preparing the energy conversion layer 34 from a formulation in a liquid carrier medium and coating the energy conversion layer 34 to a desired planar and/or non-planar substrate of a vehicle fixture. The energy conversion layer 34 may be deposited on a vehicle fixture by painting, screen printing, spraying, slot coating, dip coating, roller coating, and bar coating. Additionally, the energy conversion layer 34 may be prepared by methods that do not use a liquid carrier medium.

For example, a solid state solution (homogenous mixture in a dry state) of one or more photoluminescent materials may be incorporated in a polymer matrix 40 to provide the energy conversion layer 34. The polymer matrix 40 may be formed by extrusion, injection molding, compression molding, calendaring, thermoforming, etc. In instances where one or more energy conversion layers 34 are rendered as particles, the single or multilayered energy conversion layers 34 may be implanted into a vehicle fixture or panel. When the energy conversion layer 34 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 32 may optionally include at least one stability layer 36 to protect the photoluminescent material contained within the energy conversion layer 34 from photolytic and thermal degradation. The stability layer 36 may be configured as a separate layer optically coupled and adhered to the energy conversion layer 34. The stability layer 36 may also be integrated with the energy conversion layer 34. The photoluminescent structure 32 may also optionally include a protection layer 38 optically coupled and adhered to the stability layer 36 or any layer or coating to protect the photoluminescent structure 32 from physical and chemical damage arising from environmental exposure.

The stability layer 36 and/or the protection layer 38 may be combined with the energy conversion layer 34 to form an integrated photoluminescent structure 32 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 32. Once formed, the photoluminescent structure 32 may be applied to a chosen vehicle fixture.

In some implementations, the photoluminescent structure 32 may be incorporated into a vehicle fixture as one or more discrete multilayered particles as shown in FIG. 2C. The photoluminescent structure 32 may also be provided as one or more discrete multilayered particles dispersed in the polymer matrix 40 that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 3:
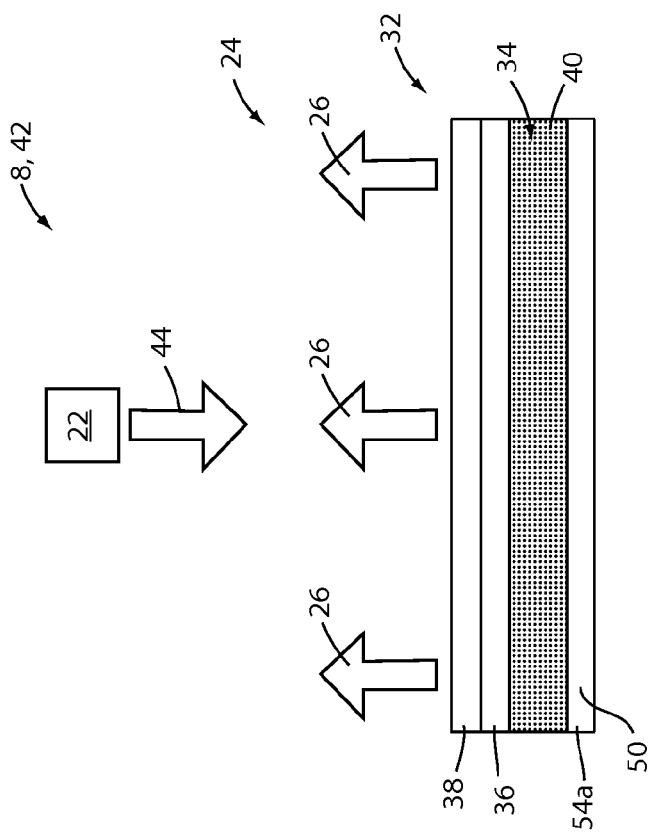
FIG. 3 is a schematic view of a front-lit configuration of a lighting apparatus configured to convert a first wavelength of light to at least a second wavelength.

Referring to FIG. 3, the lighting system 8 is generally shown according to a front-lit configuration 42. In this configuration, the light or an excitation emission 44 is emitted from the light source 22 and is converted to the output emission 26 by the energy conversion layer 34 of the at least one photoluminescent portion 24. The photoluminescent portion 24 may be disposed proximate the panel 10 and may be configured to illuminate at least one of the apertures 18. The front-lit configuration 42 is discussed further in reference to FIG. 5.

The excitation emission 44 may comprise the first wavelength, and the output emission 26 may comprise at least the second wavelength. The lighting system 8 comprises the photoluminescent structure 32 disposed on or in at least one photoluminescent portion 24, for example the first photoluminescent portion 48. The photoluminescent structure 32 may be rendered as a coating and applied to a substrate 50 of a vehicle fixture. In an exemplary embodiment, the substrate 50 may correspond to a screen 54a disposed in the aperture 18. The photoluminescent material may also be dispersed as a polymer matrix 40 corresponding to the energy conversion layer 34, which may be utilized to form at least a portion of the panel 10 corresponding to one or more of the apertures 18 and/or the screen 54a.

In some implementations, the energy conversion layer 34 may further include the stability layer 36 and/or the protection layer 38. In response to at least one emitter of the light source 22 being activated, the excitation emission 44 is received by the energy conversion layer 34 and converted from the first wavelength $\lambda_1$ to an output emission having at least the second wavelength, for example, the output emission 26. The output emissions discussed herein may comprise a plurality of wavelengths configured to emit any color of light from each of the photoluminescent portions discussed herein. In some implementations, each of the output emissions may correspond to different color of light. The colors of light of the output emissions may correspond to the photochemical structure of each of the photoluminescent portions. In this way, each of the output emissions may be configured to emit different colors of light in response to receiving an excitation emission.

In various implementations, the lighting system 8 comprises at least one photoluminescent material incorporated in the polymer matrix 40 and/or energy conversion layer 34 and is configured to convert an excitation emission at the first wavelength $\lambda_1$ to the output emissions having at least the second wavelength. In order to generate the plurality of wavelengths, the energy conversion layer 34 may comprise one or more photoluminescent materials configured to emit the output emissions as wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials may vary in output intensity, output wavelength, and peak absorption wavelengths based on a particular photochemical structure and combinations of photochemical structures utilized in the energy conversion layer 34. As an example, the output emission 26 may be changed by adjusting the wavelength of an excitation emission to activate the photoluminescent materials at different intensities to alter the color of the output emission 26. In addition to, or alternatively to the red, green, and blue-emitting photoluminescent materials, other photoluminescent materials may be utilized alone and in various combinations to generate the output emissions in a wide variety of colors. In this way, the lighting system 8 may be configured for a variety of applications to provide a desired lighting color and effect for the vehicle 12.

To achieve the various colors and combinations of photoluminescent materials described herein, the lighting system 8 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Pat. No. 9,057,021 to Kingsley et al., entitled "PHOTOLUMINESCENT OBJECTS," filed Mar. 6, 2014; and U.S. Patent No. 9,493,699 to Agrawal et al., entitled "CHROMIC LUMINESCENT COMPOSITIONS AND TEXTILES," filed Apr. 17, 2014, all of which are incorporated herein by reference in their entirety.

The light source 22 may also be referred to as an excitation source and is operable to emit at least the excitation emission 44 or any of the excitation emissions discussed herein. The light source 22 or each of the emitters may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the light source 22 may be configured such that the first wavelength $\lambda_1$ corresponds to at least one absorption wavelength of the one or more photoluminescent materials of the energy conversion layer 34 and/or polymer matrix 40. In response to receiving the light at the first wavelength $\lambda_1$, the energy conversion layer 34 may be excited and output the one or more output wavelengths, for example, the second emission having the second wavelength $\lambda_2$. The excitation emission 44 provides an excitation source for the energy conversion layer 34 by targeting absorption wavelengths of a particular photoluminescent material or combination thereof utilized therein. As such, the lighting system 8 may configured to output the output emissions at a desired light intensity and color.

In an exemplary implementation, the light source 22 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, the first wavelength $\lambda_1$ may be approximately equal to 470 nm. Though particular wavelengths and ranges of wavelengths are discussed in reference to the first wavelength, the first wavelength may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting system 8 due to these wavelengths having limited perceptual acuity in the visible spectrum of the human eye. By utilizing shorter wavelengths for the first wavelength $\lambda_1$, and converting the first wavelength with the conversion layer 34 to at least one longer wavelength, the lighting system 8 may create a visual effect of light originating from the photoluminescent structure 32. In this configuration, the lighting system 8 may provide for a cost effective system to provide lighting in a variety of locations.

As discussed herein, each of the plurality of wavelengths corresponding to the output emissions may correspond to a significantly different spectral color range. The second wavelength may correspond to a plurality of wavelengths configured to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions converted from the first wavelength.

Figure 4:
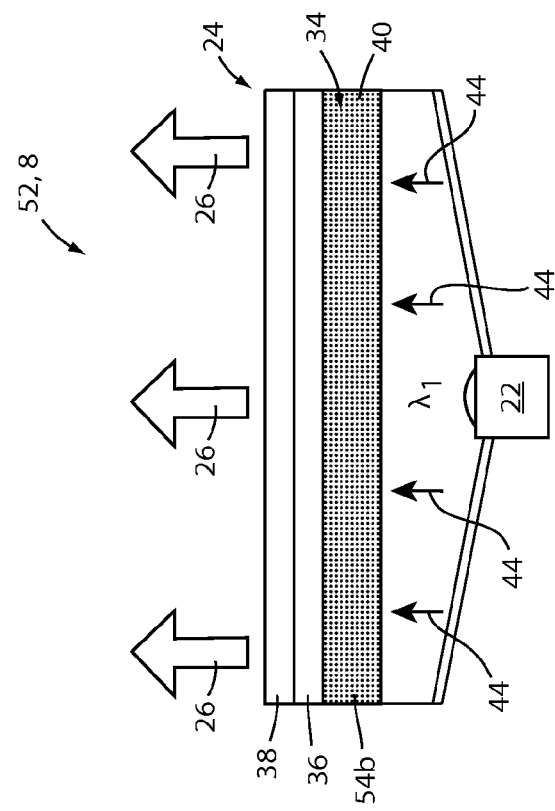
FIG. 4 is a schematic view of a back-lit configuration of a lighting apparatus configured to convert a first wavelength of light to at least a second wavelength.

Referring to FIG. 4, the lighting system 8 is generally shown according to a back-lit configuration 52 and may be configured to convert the excitation emission 44 from the light source 22 to the output emission 26. The back-lit configuration 52 may correspond to a configuration discussed in reference to FIG. 7 demonstrating a screen 54b which may be composed of an at least partially light transmissive material having the photoluminescent portion 24 disposed thereon. The back-lit configuration 52 comprises the energy conversion layer 34 and/or photoluminescent material dispersed in a polymer matrix 40. Similar to the energy conversion layer 34 demonstrated in reference to the front-lit configuration 42, the energy conversion layer 34 may be configured to be excited and output the one or more wavelengths corresponding to the second wavelength in response to receiving the excitation emission 44. In the back-lit configuration 52, the polymer matrix may be of at least partially transparent material forming the screen 54b such that the excitation emission may be converted by the photoluminescent portion 24 to emit the output emission 26.

The plurality of wavelengths of the output emission 26 may be configured to emit any color of light from the photoluminescent portion 24 in response to the excitation of the energy conversion layer 34. The color of the light corresponding to the output emission 26 may be controlled by utilizing particular types and/or ratios of photoluminescent materials as discussed herein. The output emission 26 may correspond to light output that may illuminate at least a portion of the vehicle 12 proximate the panel 10. In this configuration, the lighting system 8 may be operable to illuminate an exterior portion of the vehicle 12.

In some implementations, each of the photoluminescent portions discussed herein (e.g. photoluminescent portion 24) may comprise organic or inorganic fluorescent dye configured to convert the excitation emission 44 to the output emission 26. For example, the photoluminescent portions may comprise a photoluminescent structure of rylenes, xanthenes, porphyrins, phthalocyanines, or other materials suited to a particular Stokes Shift defined by an absorption range and emission fluorescence. In some embodiments, the photoluminescent portions may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received in the excitation emission 44 configured to excite a specific photoluminescent material and emit an output emission having a desired color.

The at least one photoluminescent portion 24 may be configured to convert an excitation emission emitted from the light source 22 to the output emission 26. The excitation emission may comprise the first wavelength of light. The output emission 26 and each of the output emissions discussed herein may comprise at least a second wavelength of the light. The second wavelength of light may comprise at least one wavelength having a longer wavelength than the first wavelength. As discussed herein, the photoluminescent portion 24 and other photoluminescent portions may be configured to have photochemical properties configured to convert the first wavelength of light from the light source 22 to the second wavelength. The second wavelength may comprise additional wavelengths, including various combinations of wavelengths to emit light from the lighting system 8.

Figure 5:
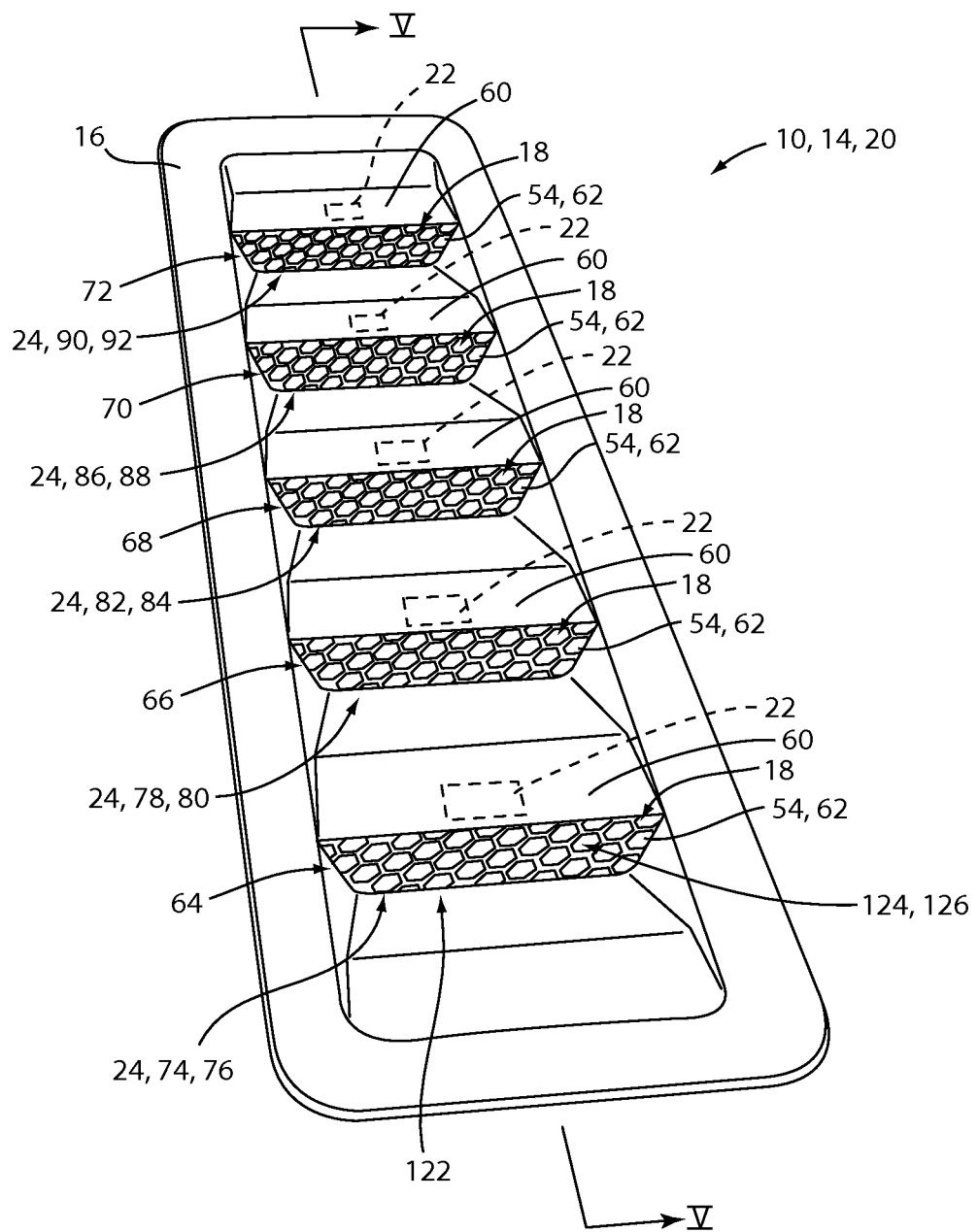
FIG. 5 is a detailed projected view of a vent disposed in a panel of a vehicle demonstrating a lighting system.

Referring now to FIG. 5, the lighting system 8 is shown corresponding to the vent 16 forming a portion of the hood 14 as the insert 20. The vent 16 comprises the plurality of apertures 18 formed in the insert 20. At least one of the apertures comprises a light source 22 configured to emit the excitation emission 44. The excitation emission 44 may be configured to excite at least one photoluminescent portion 24 disposed proximate at least one of the apertures 18. In this configuration, the at least one photoluminescent portion 24 may be configured to emit the output emission 26 to illuminate at least a portion of the screen 54.

The vent 16 may comprise a plurality of baffles 60 configured to form the apertures 18. Each of the baffles 60 may be angled toward a passenger compartment or front windscreen of the vehicle 12. A plurality of screens 62 may comprise at least one photoluminescent portion 24 disposed therein and/or applied as a coating on a surface thereof. In an exemplary embodiment, each of the apertures 18 formed in the insert 20 comprises the light source 22 disposed proximate the screen 54. In this configuration, the lighting system 8 may be configured to selectively illuminate each of the screens 54 independently to emit ambient lighting in the form of one or more output emissions from the apertures 18.

The baffles 60 may be configured to direct the one or more output emissions 26 from a plurality of screens 62 such that the output emissions 26 are clearly visible to one or more occupants of the vehicle 12 and significantly masked from visibility from those outside the vehicle 12. In this configuration, the lighting system 8 may be operable to illuminate at least one of the apertures 18 to create an ambient lighting effect for the vehicle 12 by illuminating one or more of the screens 62 without distracting drivers of other vehicles that may be operating nearby. Additionally, the configuration of the baffles 60 in the vent 16 may provide for the lighting system 8 to safely operate according to one or more legal requirements for operation of the vehicle 12 on public motorways.

Each light source 22 may be in communication with a controller, which may further be in communication with one or more vehicle systems via a communication bus. Each light source 22 may be activated independently by the controller such that the excitation emissions 44 emitted from at least one emitter to excite each of the photoluminescent portions 24. The controller may be configured to illuminate each of the photoluminescent portions 24 in response to various vehicle systems, for example a tachometer, a temperature gauge, a speedometer, etc. In such implementations, the controller may be configured to illuminate more of the photoluminescent portions 24 by selectively illuminating the emitters disposed proximate thereto as discussed in reference to FIGS. 6 and 7.

For example, the controller may illuminate each of the emitter of the light source 22 such that an increasing number of the photoluminescent portions 24 corresponding to the apertures 18 are illuminated. The photoluminescent portions 24 may be illuminated in response to the controller identifying that a signal corresponding to the tachometer, the temperature gauge, or speedometer has exceeded a threshold. That is, the controller may illuminate an additional emitter of the light source 22 in response to receiving a signal corresponding to an increased rate of engine operation, an increased engine temperature, or and increased vehicle speed, respectively. In this configuration, the lighting system 8 may be configured to provide information to an operator of the vehicle corresponding an operating condition of the vehicle 12 (e.g. the rate of engine operation, the engine temperature, the vehicle speed, etc.). This information may be communicated to the operator of the vehicle 12 by selectively illuminating a number of the photoluminescent portions 24 corresponding to the operating condition.

As demonstrated in FIG. 5, the lighting system may correspond to the front-lit configuration 42 or the back-lit configuration 52. The front-lit configuration 42 and the back-lit configuration 52 are discussed further in reference to FIGS. 6 and 7, respectively. In an exemplary implementation, the at least one photoluminescent portion may correspond to a plurality of photoluminescent portions. For example, the at least one photoluminescent portion 24 may correspond to a first photoluminescent portion 64, a second photoluminescent portion 66, a third photoluminescent portion 68, a fourth photoluminescent portion 70, and a fifth photoluminescent portion 72. In this configuration, each of the screens 62 may be configured to illuminate in different colors in response to receiving the excitation emission 44 from the emitters of the source 22.

Each of the operating conditions discussed herein may be communicated to the controller as one or more signals identifying a rate, intensity, and/or amplitude of each of the operating conditions discussed herein. In an exemplary embodiment, the controller may illuminate the first photoluminescent portion 64 in response to an engine of the vehicle 12 idling and/or a headlight system of the vehicle 12 being active. The controller may illuminate the second photoluminescent portion 66 in response to receiving a signal exceeding a first threshold. The controller may illuminate the third photoluminescent portion 68 in response to receiving a signal exceeding a second threshold. The controller may illuminate the fourth photoluminescent portion 70 in response to receiving a signal exceeding a third threshold. The controller may illuminate the fifth photoluminescent portion 72 in response to receiving a signal exceeding a fourth threshold. In this configuration, the controller may be configured to sequentially illuminate each of the photoluminescent portions 64, 66, 68, 70, and 72 in response to an operating condition of the vehicle 12.

Additionally, each of the photoluminescent portions 64, 66, 68, 70, and 72 may be configured to illuminate in one or more colors. For example, the first photoluminescent portion 64 may comprise a photoluminescent material configured to emit a first output color 74 corresponding to a first output emission 76. The second photoluminescent portion 66 may comprise a photoluminescent material configured to emit a second output color 78 corresponding to a second output emission 80. The third photoluminescent portion 68 may comprise a photoluminescent material configured to emit a third output color 82 corresponding to a third output emission 84. The fourth photoluminescent portion 70 may comprise a photoluminescent material configured to emit a fourth output color 86 corresponding to a fourth output emission 88. The fifth photoluminescent portion 72 may comprise a photoluminescent material configured to emit a fifth output color 90 corresponding to a fifth output emission 92. In this configuration, each of the photoluminescent portions 64, 66, 68, 70, and 72 may each be configured to output one or more colors of light such that each of the apertures 18 may be configured to emit ambient light in a wide variety of colors.

Figure 6:
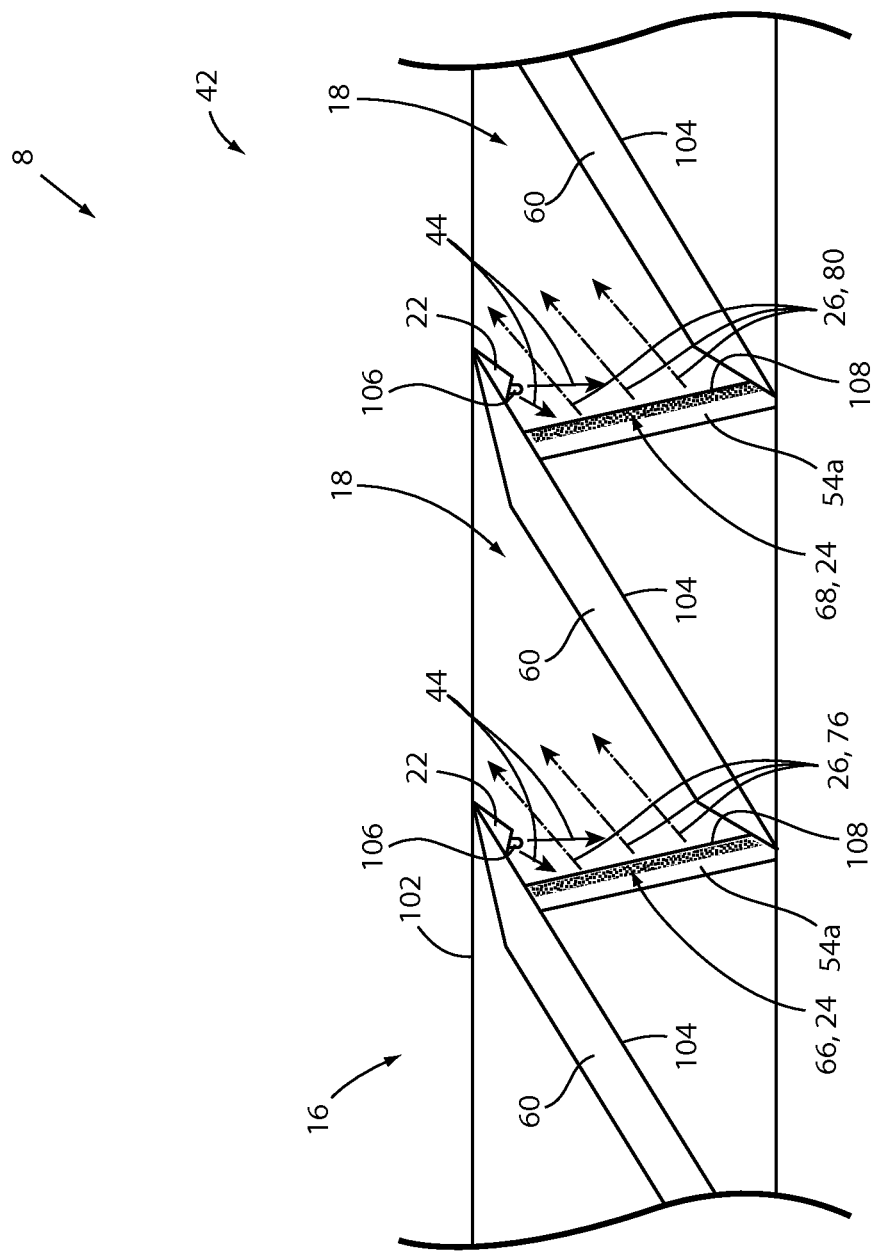
FIG. 6 is a cross-sectional view of a vent disposed in a hood of a vehicle demonstrating a front lit configuration of a lighting system.
Figure 7:
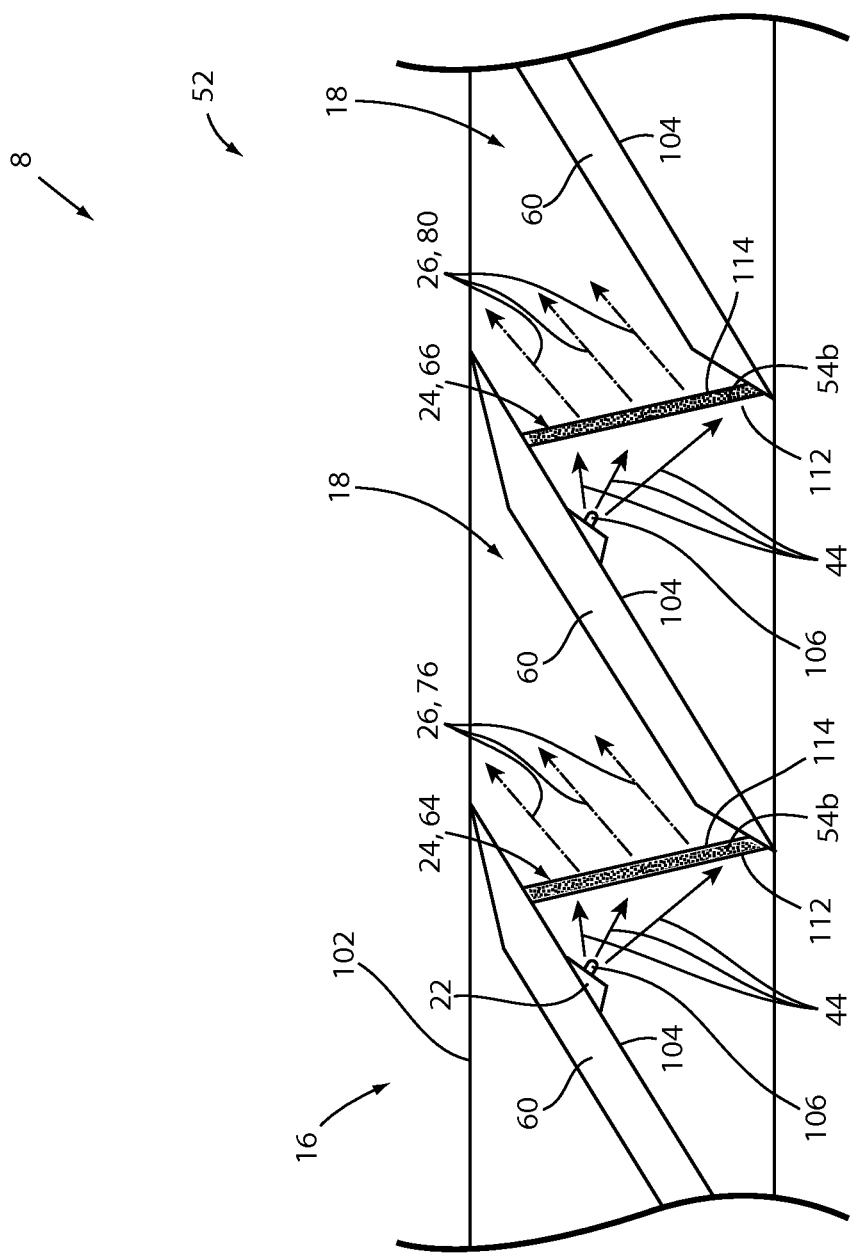
FIG. 7 is a cross-sectional view of a vent disposed in a hood of a vehicle demonstrating a back-lit configuration of a lighting system.

Referring now to FIGS. 6 and 7, cross-sectional views along section line V-V of the vent 16 are shown corresponding to the front-lit configuration 42 and the back-lit configuration 52, respectively. In the front-lit configuration 42, each light source 22 is disposed outside the screen 54a relative to an exterior surface 102 of the vent 16. Each light source 22 may be affixed to and/or formed into an inner surface 104 of each baffle 60. In this configuration, at least one of a plurality of emitters 106 of the light source 22 may be selectively illuminated by the controller such that the excitation emission 44 impinges upon an exterior surface 108 of at least one of the screens 54a. In response to receiving the excitation emission 44, the photoluminescent portion 24 disposed on the exterior surface 108 may become excited such that the output emission 26 is emitted from the exterior surface 108 of the at least one corresponding screen 54a. In this configuration, the lighting system 8 is operable to selectively illuminate each of the apertures 18 by illuminating at least a portion of each of the screens 54a.

As demonstrated in FIG. 6, the first photoluminescent portion 64 and the second photoluminescent portion 66 are shown to demonstrate detail. The first photoluminescent portion 64 may emit the first output emission 76 in response to receiving the excitation emission 44. Additionally, the second photoluminescent portion 66 may emit the second output emission 80 in response to receiving the excitation emission 44. In this configuration, the controller of the lighting system 8 may selectively illuminate each of the photoluminescent portions discussed herein by selectively illuminating an emitter 106 of the light source 22 corresponding to a selected photoluminescent portion.

Referring now to FIG. 7, in the back-lit configuration 52, each emitter 106 of the light source 22 is disposed inside the screen 54b relative to an exterior surface 102 of the vent 16. Each emitter 106 may be affixed to and/or formed onto an inner surface 104 of each baffle 60. In this configuration, each emitter 106 of the light source 22 may be selectively activated by the controller such that the excitation emission 44 impinges upon an interior surface 112 at least one of the screens 54b. The excitation emission 44 may pass thorough the at least partially light transmissive material of the screen 54b. As the excitation emission passes through the material of the screen 54b, the photoluminescent portion 24 may become excited such that the output emission 26 is emitted from the exterior surface 114 of the at least one corresponding screen 54b. In this configuration, the lighting system 8 is operable to selectively illuminate each of the apertures 18 by illuminating at least a portion of each screen 54b.

As demonstrated in FIG. 7, the first photoluminescent portion 64 and the second photoluminescent portion 66 are shown to demonstrate detail. The first photoluminescent portion 64 may emit the first output emission 76 in response to receiving the excitation emission 44. Additionally, the second photoluminescent portion 66 may emit the second output emission 80 in response to receiving the excitation emission 44. In this configuration, the controller of the lighting system 8 may selectively illuminate each of the photoluminescent portions 24 discussed herein by selectively illuminating an emitter 106 of the light source 22 corresponding to a selected photoluminescent portion.

Referring again to FIGS. 1 and 5, in some embodiments, one or more of the photoluminescent portions 64, 66, 68, 70, and 72 may further be configured to emit an additional color of light in response to receiving an excitation emission. For example, the first photoluminescent portion 64 may be configured to emit a the first output color 74 in response to receiving a first excitation emission 44a and a sixth output color 122 in response to receiving a second excitation emission 44b. In this example, the sixth output color 122 of light may be activated similar to the first output color 74, but may be activated in response to an excitation emission comprising a substantially different wavelength than the first excitation emission 44. Each of the first excitation emission 44a and the second excitation emission 44b may be denoted as the excitation emission 44 shown in the FIGS. 3, 4, 6, and 7.

For example, in some embodiments, the emitter 106 of the light source 22 may correspond to a first emitter configured to emit a first excitation emission and a second emitter configured to emit a second excitation emission. In this configuration, the first excitation emission and the second excitation emission may be operable to excite a first photoluminescent element 124 and a second photoluminescent element 126 of each photoluminescent portion 24 substantially independently. The first photoluminescent element 124 may be configured to emit the first output color 74 and the second photoluminescent element 126 may be configured to emit the sixth output color 122. Each of the photoluminescent materials corresponding to the photoluminescent elements 124 and 126 may be excited substantially independently by the first emitter and the second emitter corresponding to the emitter 106 of the light source 22.

Referring again to FIG. 1, in some embodiments, the lighting system 8 may be configured to illuminate at least one of the apertures 18 to display a turn indicator 128. The turn indicator 128 may comprise a first directional indicator 129a and a second direction indicator 129b corresponding to the first photoluminescent portion 64 disposed in vents 16 located on opposing sides of the vehicle 12. However, it shall be understood that the turn indicator 128 and other color changing configurations may be implemented in any of the photoluminescent portions discussed herein (e.g. 64, 66, 68, 70, 72) or utilized in other portions of the vehicle 12. The first photoluminescent portion 64 may comprise the first photoluminescent element 124 and the second photoluminescent element 126 as discussed in reference to FIG. 5. Each of the photoluminescent elements may correspond to one or more photoluminescent materials. The first photoluminescent element 124 and the second photoluminescent element 126 may also be configured to have a first absorption range and a second absorption range, respectively. In general, the first absorption range and the second absorption range may correspond to substantially different ranges or partially overlapping ranges of wavelengths of light.

Figure 8:
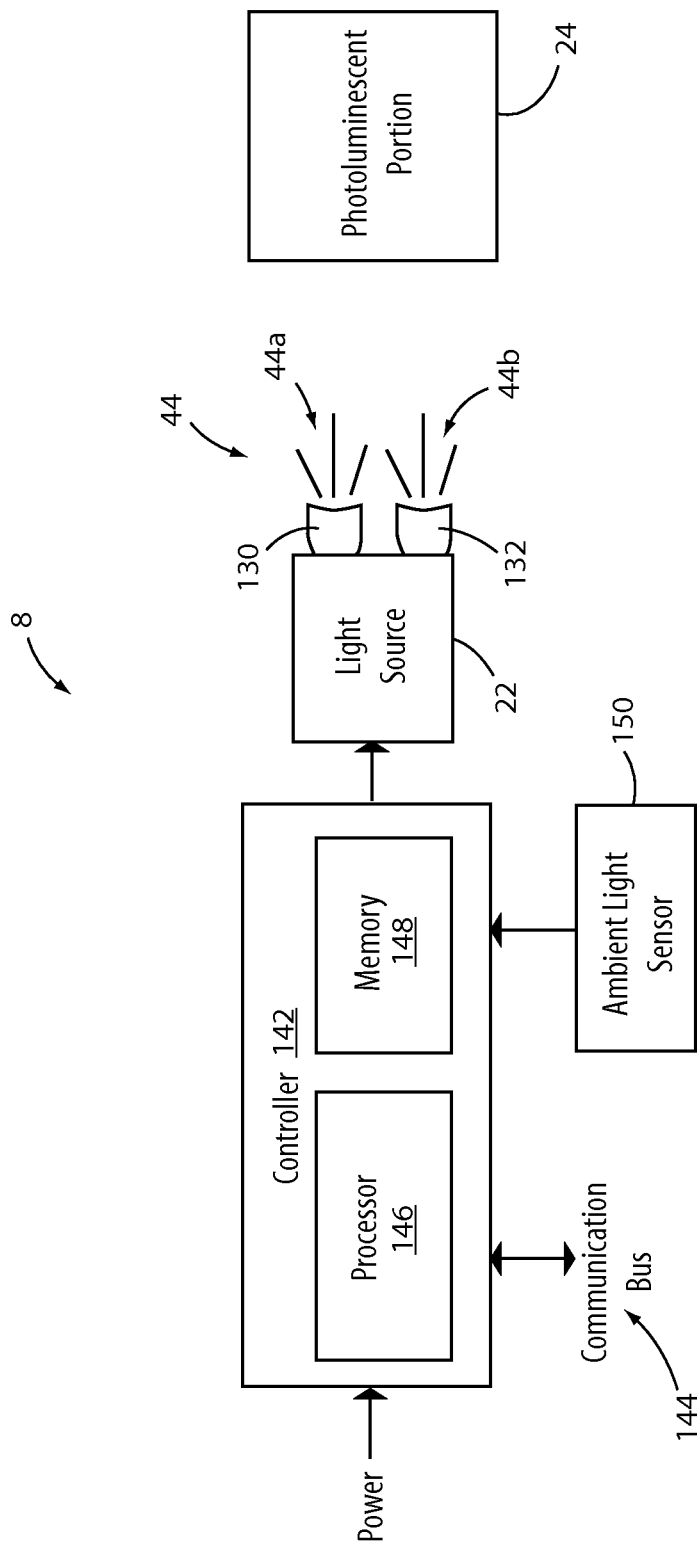
FIG. 8 is a block diagram of a lighting system configured to illuminate at least one photoluminescent portion.

The first emitter and the second emitter are shown in FIG. 8 and denoted as reference numerals 130 and 132. The first emitter 130 may be configured to output the first excitation emission 44a having a wavelength corresponding to a peak absorption of the first absorption range. The second emitter 132 may be configured to output the second excitation emission 44b having a wavelength corresponding to a peak absorption of the second absorption range.

In embodiments having substantially different ranges for the first absorption range and the second absorption, the first emitter 130 and the second emitter 132 may be operable to excite each of the first photoluminescent element 124 and the second photoluminescent element 126 substantially independently. The controller of the lighting system 8 may further be operable to control the intensity of the first excitation emission and the second excitation emission to control a color of light output from the first photoluminescent portion 64. The lighting system 8 may be operable to adjust the intensity of each emitter 130, 132 of the light source 22 by varying a magnitude and/or a duty cycle of the voltage/current supplied to the emitters 130, 132. In this way, the lighting system 8 may be operable to adjust a relative intensity of light emitted from the first photoluminescent element 124 and the second photoluminescent element 126 such that the color of light output from the first photoluminescent portion 64 is a combination of the first output color 74 and the sixth output color 122.

By utilizing photoluminescent materials having absorption ranges corresponding to substantially different wavelengths of light, the first photoluminescent element 124 and the second photoluminescent element 126 may be excited independently by their respective emitters 130 and 132. For example, the first output color 74 may correspond to red light and the sixth output color 122 may correspond to green light. In this configuration, the system 8 may be operable to utilize the first photoluminescent portion 64 as a tachometer display and a turn indicator. For example, the controller may be operable to selectively activate each of the photoluminescent portions 64, 66, 68, 70, 72 to display a relative intensity of the operation of the engine. The engine operation may be displayed in colors ranging from green, corresponding to the first photoluminescent portion 64, to red, corresponding to the fifth photoluminescent portion 72. In this configuration, the intensity of the operation of the engine may be visually communicated to an operator of the vehicle 12.

Additionally, the controller may be configured to selectively illuminate at least one of the photoluminescent portions 64, 66, 68, 70, 72 in a different color (e.g. yellow or orange) to indicate the activation of the turn indicator 128 of the vehicle 12 in addition to the tachometer display. For example, by adjusting the intensity of the first emitter 130 and the second emitter 132, the controller may change the output color emitted from the first photoluminescent portion from green to orange. The changing color may be controlled by adjusting the intensity of the first excitation emission 44*a* and the second excitation emission 44*b* to output any combination of the first output color 74 and the sixth output color 122 from the first photoluminescent portion 64. In this configuration, one or more of the photoluminescent portions may be configured to output any color of light by blending a first color and a second color by controlling an intensity of the first excitation emission 44*a* and the second excitation emission 44*b*.

An example of a particular combination of photoluminescent materials is now discussed in reference to the first photoluminescent element 124 and the second photoluminescent element 126. The first absorption range of the first photoluminescent element 124 may correspond to a range of wavelengths in blue and/or near UV range of light having wavelengths of approximately 390-450 nm. The second absorption range of the second photoluminescent element 126 may correspond to a substantially non-overlapping range of wavelengths in the UV and/or blue range of light having wavelengths of approximately 250-410 nm. The first excitation emission, emitted from the first emitter 130, may be approximately 470 nm and configured to cause the first photoluminescent element 124 to output an emission at approximately 525 nm. The second excitation emission, emitted from the second emitter 132, may be approximately 370 nm and configured to cause the second photoluminescent element 126 to output an emission at approximately 645 nm. In this way, the first photoluminescent element 124 and the second photoluminescent element 126 may be selectively excited by each of the emitters 130, 132 to independently output a substantially green colored light and a substantially orange-red colored light, respectively.

In general, the photoluminescent materials of the first photoluminescent element 124 and the second photoluminescent element 126 may be combined in various proportions, types, layers, etc. to generate a variety of colors for the each of the luminescent emissions. Though particular materials and structures of photoluminescent materials are discussed herein, various materials may be utilized without departing from the spirit of the disclosure. In some implementations, the first photoluminescent element 124 is configured to have the first absorption range being substantially greater than the second absorption range. Additionally, the first photoluminescent element 124 may be configured to output a wavelength substantially less than the second photoluminescent element 126.

In some implementations, the first photoluminescent element 124 may comprise an organic fluorescent dye configured to convert the first excitation emission to output an emission having the first output color 74, which may correspond to substantially green colored light. For example, the first photoluminescent material may comprise a photoluminescent structure of rylenes, xanthenes, porphyrins, phthalocyanines, or other materials suited to a particular Stokes Shift defined by the first absorption range and emission fluorescence. The first photoluminescent element 124 and a corresponding material may be configured to have a shorter Stokes Shift than the second photoluminescent element 126. In this way, each of the photoluminescent elements 124 and 126 may be independently illuminated by the emitters 130 and 132 to output different colors of light.

The second photoluminescent element 126 may comprise a photoluminescent structure 32 configured to generate a longer Stokes Shift than the first photoluminescent element 124. The second photoluminescent element 126 may comprise an organic or inorganic material configured to have the second absorption range and a desired output wavelength or color. In an exemplary embodiment, the photoluminescent structure 32 of the second photoluminescent element 126 may be of at least one inorganic luminescent material selected from the group of phosphors. The inorganic luminescent material may more particularly be from the group of Ce-doped garnets, such as YAG:Ce. This configuration may provide for a second Stokes Shift of the second photoluminescent element 126 to be longer than a first Stokes Shift of the first photoluminescent element 124.

Additionally, the system 8 may be operable to output a variety of colors from each of the photoluminescent portions (e.g. 64, 66, 68, 70, 72) by blending the first excitation emission 44*a* and the second excitation emission 44*b* at different intensities. In this configuration, the light source 22 may be operable to blend the light emitted from each of the photoluminescent portions 24 to emit at least a first color of light and a second color of light to display an engine operating condition (e.g. the rate of engine operation, the engine temperature, the vehicle speed, etc.) and at least one additional indicator, for example a signal or lighting indicator.

Referring now to FIG. 8, a block diagram of the lighting system 8 demonstrating a controller 142 configured to control the illumination of the light source 22 to illuminate the photoluminescent portions 24. The controller 142 may be in communication with a communication bus 144 of the vehicle. The communication bus 144 may be configured to deliver signals to the controller 142 identifying various vehicle states. For example, the communication bus 144 may be configured to communicate to the controller 142 a drive selection of the vehicle, an ignition state, a remote activation of the light source 22, or any other information or control signals that may be utilized to adjust the illumination of the lighting system 8. Additionally the controller 142 may be configured to receive at least one signal identifying a rate, intensity, and/or amplitude of each of the operating conditions. Such signals may be communicated to the controller 142 via various vehicle systems, for example, a tachometer, a temperature gauge, a speedometer, etc. In this configuration, the controller 142 of the lighting system 8 may be configured to provide information to an operator of the vehicle 12 corresponding to an operating condition (e.g. the rate of engine operation, the engine temperature, the vehicle speed, a status of a turn indicator, etc.) by selectively illuminating the first emitter 130 or the second emitter 132 of the light source 22. In this configuration, the controller 142 is operable to selectively activate the first emitter 130 and the second emitter 132 to illuminate the first photoluminescent element 124 and the second photoluminescent element 126, substantially independently.

The controller 142 may comprise a processor 146 comprising one or more circuits configured to receive the signals from the communication bus 144 and output signals to control the light source 22 to emit the first excitation emission 44*a*, the second emission 44*b* and various combinations thereof. The processor 146 may be in communication with a memory 148 configured to store instructions to control the activation of the light source 22. The controller 142 may further be in communication with an ambient light sensor 150. The ambient light sensor 150 may be operable to communicate a light condition, for example a level brightness or intensity of the ambient light proximate the vehicle 12. In response to the level of the ambient light, the controller 142 may be configured to adjust a light intensity output from one or more emitters of each of the light sources 22. The intensity of the light output from the light source 22 may be adjusted by controlling a duty cycle, current, or voltage supplied to the light source 22.

The disclosure provides for a lighting system configured to illuminate at least a portion of a vent or hood scoop disposed in a hood or panel of the vehicle. In some embodiments, a plurality of emitters may be utilized to selectively illuminate a plurality of apertures that form the vent. In this configuration, the lighting system 8 may be configured to selectively illuminate each of the apertures corresponding to a tachometer function, a turn indicator, a temperature gauge, a vehicle status, and/or a variety of vehicle conditions or states. The disclosure may provide for lighting systems configured to provide lighting to improve an appearance and add valuable features to a variety of vehicles. While the various implementations of the lighting system described herein refer to specific structures demonstrated in reference to at least one automotive vehicle, it will be appreciated that the lighting system may be utilized in a variety of applications.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   at least one aperture disposed in a panel of the vehicle;
   a light source disposed proximate the aperture and configured to emit a first emission having a first wavelength;
   a first photoluminescent portion disposed proximate the panel substantially within the aperture and configured to emit a second emission having a second wavelength in response to receiving the first emission; and
   a screen disposed in the aperture and configured to extend to a perimeter of the aperture formed by the panel, wherein the first photoluminescent portion is disposed on the screen.

2. A vehicle illumination apparatus according to claim 1, wherein the panel corresponds to an exterior panel of the vehicle.

3. A vehicle illumination apparatus according to claim 2, wherein the panel corresponds to at least a portion of a hood of the vehicle.

4. A vehicle illumination apparatus according to claim 1, wherein the light source is disposed substantially inside a cavity formed in the panel by the aperture.

5. A vehicle illumination apparatus according to claim 1, wherein the light source is disposed on an inner wall of the panel behind the screen relative to an exterior surface of the panel.

6. A vehicle illumination apparatus according to claim 5, wherein the photoluminescent portion and the screen are at least partially light transmissive and configured to illuminate the screen in a backlit configuration such that an exterior surface of the screen illuminates in response to receiving the first emission.

7. A vehicle illumination apparatus comprising:
   at least one aperture disposed in a hood panel of the vehicle;
   a light source disposed proximate the aperture and configured to emit a first emission having a first wavelength;
   a first photoluminescent portion disposed proximate the panel substantially within the aperture and configured to emit a second emission having a second wavelength in response to receiving the first emission; and
   a screen disposed in the aperture and configured to extend to a perimeter of the aperture formed by the panel.

8. A vehicle illumination apparatus according to claim 7, wherein the photoluminescent portion is disposed on the screen.

9. A vehicle illumination apparatus according to claim 7, wherein the light source is disposed outside of the screen relative to an exterior surface of the panel.

10. A vehicle illumination apparatus according to claim 7, wherein the at least one aperture includes apertures formed in the panel of the vehicle such that the apertures are sloped toward a passenger cabin of the vehicle and configured to direct the second emission from each of the apertures to display a tachometer status to the passenger cabin.

11. A vehicle illumination apparatus comprising:
    a plurality of apertures disposed in a hood panel of the vehicle;
    a light source comprising a plurality of emitters disposed proximate the apertures and configured to emit a first excitation emission;
    a photoluminescent portion disposed substantially within the apertures and configured to emit a first output emission in response to receiving the first excitation emission; and
    a controller configured to selectively activate each of the emitters.

12. A vehicle illumination apparatus according to claim 11, wherein the controller is configured to illuminate at least one emitter corresponding to each of the apertures in response to a rate of operation of an engine of the vehicle.

13. A vehicle illumination apparatus according to claim 11, wherein the controller is configured to sequentially illuminate more of the apertures in response to the rate of operation of the vehicle increasing.

14. A vehicle illumination apparatus according to claim 11, wherein the controller is configured to illuminate each of the emitters corresponding to an operating temperature of an engine of the vehicle.

15. A vehicle illumination apparatus according to claim 11, wherein the photoluminescent portion comprises a first photoluminescent element configured to emit the first output emission and a second photoluminescent element configured to emit a second output emission.

16. A vehicle illumination apparatus according to claim 15, wherein at least one of the emitters corresponding to an aperture is operable to emit a second excitation emission to selectively excite the second photoluminescent element to output the second output emission.

* * * * *